United States Patent [19]

Kollmann

[11] 4,412,769
[45] Nov. 1, 1983

[54] APPARATUS FOR CENTERING ALIGNMENT OF PLANAR WORKPIECES

[75] Inventor: Horst Kollmann, Dornbirn, Austria

[73] Assignee: Firma Schelling & Co., Schwarzach, Austria

[21] Appl. No.: 248,481

[22] Filed: Mar. 27, 1981

[30] Foreign Application Priority Data

Mar. 28, 1980 [AT] Austria .................................. 1711/80

[51] Int. Cl.³ ............................................ B65H 31/38
[52] U.S. Cl. ..................................... 414/36; 271/221; 414/28
[58] Field of Search ............................. 414/28, 35, 36; 271/221, 222, 236

[56] References Cited

U.S. PATENT DOCUMENTS

| 1,494,339 | 5/1924 | Clauberg | 271/222 |
| 2,137,478 | 11/1938 | Delany | 271/222 |
| 3,256,010 | 6/1966 | Buccicone | 271/221 |
| 3,439,814 | 4/1969 | Morain | 414/28 |
| 3,777,598 | 12/1973 | Campbell . | |
| 3,902,586 | 9/1975 | Hill | 414/36 X |
| 4,204,788 | 5/1980 | Massey | 271/221 X |
| 4,271,755 | 6/1981 | Kintgen et al. | 414/82 X |

FOREIGN PATENT DOCUMENTS

| 289363 | 4/1971 | Austria . | |
| 1628923 | 10/1973 | Fed. Rep. of Germany . | |
| 1453015 | 2/1974 | Fed. Rep. of Germany . | |
| 2657564 | 7/1977 | Fed. Rep. of Germany . | |
| 1116513 | 6/1968 | United Kingdom | 414/28 |
| 2010228 | 6/1979 | United Kingdom | 271/171 |
| 452950 | 5/1975 | U.S.S.R. | 271/221 |

Primary Examiner—Leslie J. Paperner
Attorney, Agent, or Firm—Toren, McGeady and Stanger

[57] ABSTRACT

Apparatus for aligning planar workpieces symmetrically relative to a center line thereof on a support table including pivotable stop members mounted for longitudinal movement along a beam upon supports which are attached to an endless chain extending around said beam to move said supports in opposed directions upon actuation of piston-cylinder units attached between said beam and said supports.

7 Claims, 3 Drawing Figures

APPARATUS FOR CENTERING ALIGNMENT OF PLANAR WORKPIECES

The present invention relates generally to a mechanism for positioning planar workpieces on a support table and more particularly to a device for aligning such workpieces at the centers thereof. More specifically, the invention relates to a device having stop members which engage the workpieces to be aligned along the edges thereof.

In processing large planar workpieces, and particularly in machines which operate with a staggered cutting procedure, planar workpieces are conveyed individually or in stacks to processing stations such as saws or other similar mechanisms. The workpieces are placed on a support table and in order to be properly stacked, they must be aligned and arranged in position before they can be conveyed to the processing station. Such alignment may proceed along two basically different concepts. In one case, the workpieces are pressed against stationary stops thereby becoming aligned in relation to such stops on the inside of the system. In another case, however, the planar workpieces are aligned in relation to an imaginary center reference line on a surface and when the alignment procedure has been completed, the workpieces will lie symmetrically relative to this line.

SUMMARY OF THE INVENTION

Briefly, the present invention may be described as apparatus for alignment of planar workpieces on a support table comprising: pivotable stop members adapted to engage the workpiece along the edges thereof; a beam extending in length over at least the dimension of the largest workpiece to be aligned; supports mounted on said beam for movement in the longitudinal direction thereof, each of said supports having mounted thereon at least one of said pivotable stop members; endless cable means circumambulating said beam and having said supports attached thereto; and piston-cylinder means having at least one of said supports connected thereto, the action of said piston-cylinder means being directed in the longitudinal direction of said beam.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
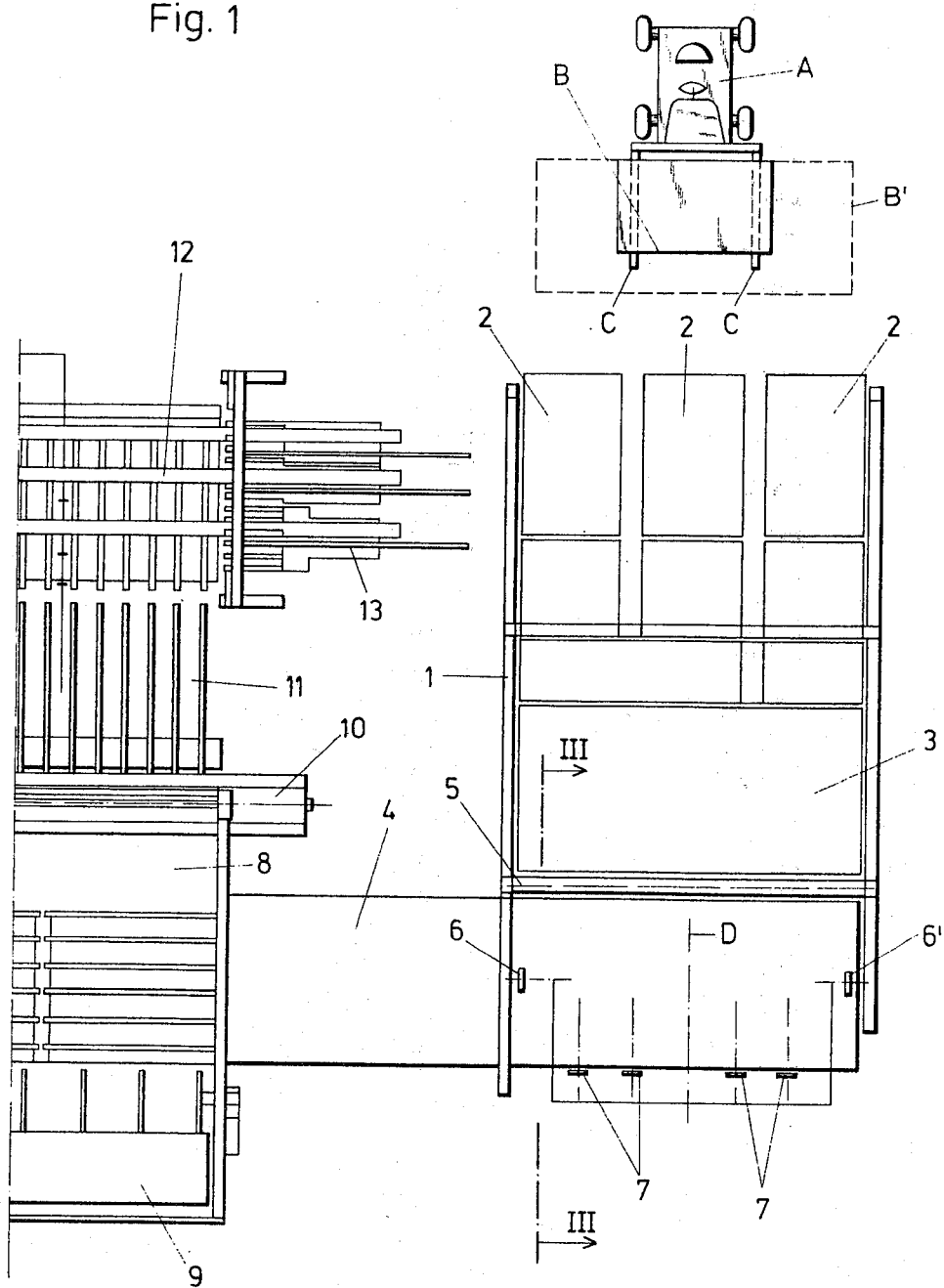
FIG. 1 is a top view showing an installation involving a staggered cutting process of planar workpieces wherein the present invention is utilized.

Referring now to the drawings, wherein similar reference numerals are used to describe similar parts throughout the various figures thereof, there is shown in FIG. 1 an overall top view of a staggered cutting installation for processing planar shaped workpieces of relatively large size, for example of the type which may be utilized in the furniture industry. The apparatus comprises a portal or frame 1 within which there are provided input roller conveyors 2 which lead to a lifting table 3. At the front side of the portal 1 there is attached a roller conveyor 4 adn between the roller conveyor 4 and the lifting table 3 there is provided a feed roller device 5.

On the output side of the feed roller device 5 there are adjustably mounted transverse alignment stops 6 and 6' and longitudinal alignment stops 7. The roller conveyor 4 leads to an angle transfer device 8 which is equipped with a slide-in truck 9 and to a first sawing mechanism 10.

From the sawing mechanism 10, a belt table leads to a second angle transfer device 12 to which there are assigned several slide-in trucks 13 running on parallel tracks, these trucks operating to then push the workpieces through a further sawing mechanism (not shown). Staggered cutting installations of this type have become known in different forms of embodiment.

An essential feature of the device illustrated is the fact that the planar workpieces deposited by the feed roller device 5 onto the roller conveyor 4 must be aligned not in relationship to a stationary stop, but rather with regard to an imaginary center line. This type of alignment is effected by operation of the transverse alignment stop members 6 and 6' whose structure and operation are described in greater detail with reference to FIGS. 2 and 3.

Each of the two alignment stops 6 and 6' shown in the drawings is mounted on a support member 14, 14' for pivotal movement about a horizontal axis 15, 15', respectively. The two pivoting axes of the alignment stops 6, 6' are arranged in alignment with each other to extend co-linearly. In their active positions, the transverse alignment stops 6, 6' extend downwardly from the respective support members 14, 14'. The two support members 14, 14' are in turn movably mounted on a beam 17, the length of the beam 17 being greater than the greatest width or the greatest length of planar workpieces 32' which are to be aligned by operation of the alignment mechanism of the invention.

Mounted at each end of the beam 17 is a freely rotatable guide roller 16, 16' with at least one of these guide rollers being coordinated with a tensioning device 18. An endless chain or cable 19 is guided around the guide rollers 16, 16' with one support member 14 being connected with one span of the chain or cable 19 and with the other support member 14' being connected with the other span of the chain 19. Clamping clips 20 and 20' are provided to effect this connection.

Above the beam 17 and fixedly connected thereto there is mounted a first piston-cylinder unit 21, with the displacement direction of this unit being parallel to the longitudinal axis or extension of the beam. The piston-cylinder unit 21 has a relatively large displacement distance which may, for example, be about 150 cm. A piston rod 22 of this first piston-cylinder unit 21 connects with a piston rod 23 of a second piston-cylinder unit 24 having a housing which is fixedly connected to the support member 14. The displacement length of the second piston-cylinder unit 24 is only a fraction of the displacement length of the first piston-cylinder unit 21 and may, for example, be of a length of approximately 20 cm.

Figure 3:
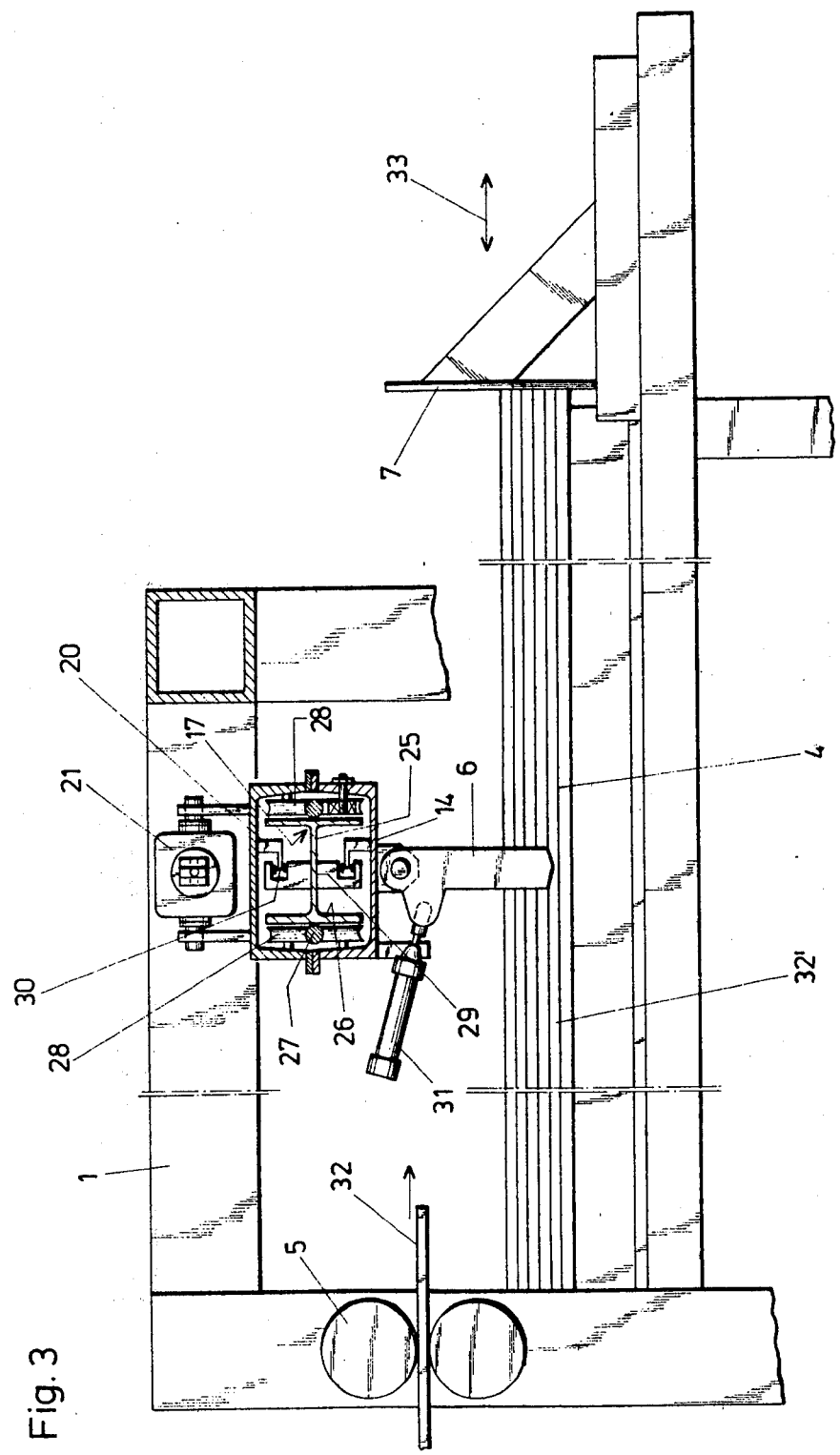
FIG. 3 is a sectional view taken along the line III—III of FIG. 2.

The structure of the beam 17 and of the support members 14, 14' may be seen more clearly in FIG. 3. The beam 17 is shaped as an I-beam having a cross piece or web 25. In the plane of the web 25, but on the outer sides of flanges 26, there are attached profiled battens 27 which serve as tracks for rollers 28 which are, in turn, mounted on the inner sides of the support members 14, 14'.

In the central area above and below the web 25 there are affixed two wood battens 29 extending over the length of the beam and having grooves 30 which open toward the outside within which there lies the chain 19. Both support members 14 and 14' consist of box-like housings open on the front side thereof extending around the beams. This is most clearly shown in the sectional view of FIG. 3.

Flanged onto each support member 14, 14' there is furthermore provided a small piston-cylinder unit 31 which with a piston rod thereof acts upon one of the stop members 6, 6' respectively. In addition to a cross-sectional view of the beam as seen in FIG. 3, there is also shown a sectional view taken through the roller conveyor 4 and the feed roller mechanism 5 through which the planar workpieces 32 are conveyed. This representation corresponds to the sectional line III—III shown in FIG. 1. Here there are already provided several workpieces 32 which are arranged in a stack resting on the roller conveyor 4. The function of aligning this stack and/or its constituent individual plates in the transverse direction is served or effected by the longitudinal alignment stops 7 which could be mounted movably and adjustably in a sliding carriage running in the direction of an arrow 33 with a piston-cylinder unit (not shown).

Figure 2:
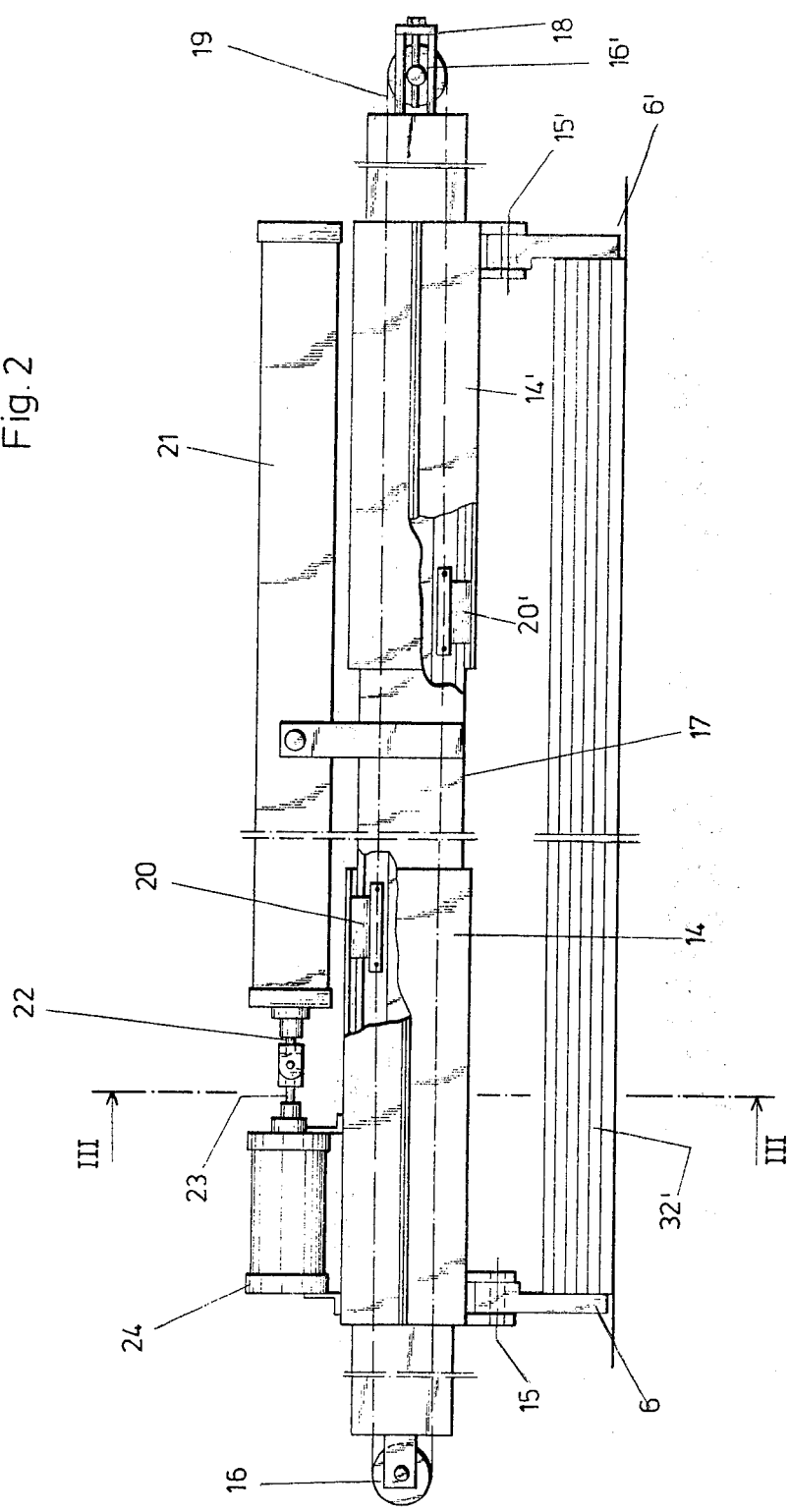
FIG. 2 is a front view of a device in accordance with the invention.

The operation of the device is best understood by reference to FIG. 2. Because of the connection of the two support members 14 and 14' with the chain 19, these supports will move from a central position inwardly and outwardly over the same distance when the two piston-cylinder units 21, 24, or at least one of them, is activated. The piston-cylinder unit 21 with the larger displacement serves to set the rough or overall positioning of the device in accordance with a rough gauging of the dimension of a workpiece. Accordingly, the alignment stops 6, 6' may first be roughly adjusted by operation of the piston-cylinder unit 21 and a finer adjustment may be performed by the smaller piston-cylinder unit 24. Actual alignment occurs through activation of the piston-cylinder unit 24 by actuation of the alignment stops 6 and 6' after each plate has been deposited in place. For this purpose, the stops are moved over only a short distance since the plates are generally similar in dimension. The beam 17 is fixedly connected with the portal or frame 1 and the planar shaped workpieces make their way individually from the lifting table 3 to the roller conveyor 4 by means of the feed roller device 5. Each planar workpiece arriving here is individually aligned with this alignment occurring not in relation to a stationary sideward stop, but in relation to an imaginary central plane or central line of the individual planar workpieces. When a workpiece stack has been formed and aligned on the roller conveyor 4, the transverse alignment stops 6, 6' are folded upwardly and the package is conveyed sideways (to the left as seen in FIG. 1) and by this method of alignment, the planar shaped workpieces will always be aligned symmetrically relative to a center line thereof and the input of the plates will also be symmetrically or centrally oriented.

In the embodiment depicted in the drawings, the transverse alignment stops 6, 6' are mounted above the roller conveyor 4. It is within the scope of the invention to provide the transverse alignment stops 6, 6' below the support surface of the roller conveyor 4. Other constructions different from those specifically shown may be provided for the beam and the supports. In the embodiment shown, one support 14 is moved along the beam 17 by the piston-cylinder unit which causes the second support to be taken along over the chain 19. It would fundamentally be within the scope of the invention to drive the chain directly through a motor drive flanged onto the beam on the front side whereby the motor could perhaps have a fast and a slow driving speed.

Feed roller devices 5 operate at high conveying speeds and deliver up to ten relatively large planar workpieces per minute. Since each individual planar workpiece must be aligned, there will be at most five seconds available to perform the introduction and alignment process for each planar workpiece. Because of the double piston-cylinder unit 5 depicted herein, an operation having a very high cycle time with a high number of strokes per unit time is possible since the corresponding alignment movement may be achieved by means of a small piston-cylinder unit whereas the iston-cylinder unit 21 with the larger displacement need only be set in action in the case of a load change in order to perform a sort of rough base measurement for newly delivered workpieces which may be of substantially different dimension than workpieces previously conveyed.

While a specific embodiment of the invention has been shown and described in detail to illustrate the application of the inventive principles, it will be understood that the invention may be embodied otherwise without departing from such principles.

What is claimed is:

1. Apparatus for alignment of planar workpieces on a support table comprising: pivotable stop members adapted to engage said workpieces along the edges thereof; a beam extending in length over at least the dimension of the largest workpiece to be aligned; supports mounted on said beam for movement in the longitudinal direction thereof, each of said supports having mounted thereon at least one of said pivotable stop members; endless cable means circumambulating said beam and having said supports attached thereto; and piston-cylinder means having at least one of said supports connected thereto, the action of said piston-cylinder means being directed in the longitudinal direction of said beam; wherein said beam is in the form of an I-beam having a horizontal web and flanges, wherein there is provided in the plane of said web on the outer side of said flanges profiled battens operating as tracks for rollers arranged on said supports and wherein in the central area on both sides of said web there are arranged battens with longitudinal grooves serving as guide tracks for said endless cable means.

2. Apparatus according to claim 1 wherein said endless cable means extends in a plane which is parallel to the longitudinal direction of said beam and wherein there are provided at the ends of said beam guide rollers for guiding said endless cable means.

3. Apparatus according to claim 1 wherein said piston-cylinder means comprise two piston-cylinder units positioned coaxially with each other and connected with each other, with the displacement length of one of said piston-cylinder units being a fraction of the displacement length of the other of said piston-cylinder units and wherein said one piston-cylinder unit is connected to one of said supports and said other piston-cylinder unit is connected with said beam.

4. Apparatus according to claim 1 wherein said supports include one support connected with one span of said endless cable means and another support connected with the other span of said endless cable means.

5. Apparatus according to claim 1 wherein said pivotable stop members are pivotally mounted on said supports and wherein for pivoting movement of said stop members there is provided a piston-cylinder unit connected with said stop member and supported on said supports.

6. Apparatus according to claim 1 wherein said piston-cylinder means are connected on one side to one of said supports and on the other side to said beam.

7. Apparatus for alignment of planar workpieces on a support table comprising: pivotable stop members adapted to engage said workpieces along the edges thereof; a beam extending in length over at least the dimension of the largest workpiece to be aligned; supports mounted on said beam for movement in the longitudinal direction thereof, each of said supports having mounted thereon at least one of said pivotable stop members; endless cable means circumambulating said beam and having said supports attached thereto; and piston-cylinder means having at least one of said supports connected thereto, the action of said piston-cylinder means being directed in the longitudinal direction of said beam; said supports being formed as box-like housings open on a front side thereof and constructed in two parts enclosing said beam, said housings having rollers supported on the inner side thereof.

* * * * *